Nov. 8, 1960 S. LEVIN 2,959,771

SEMICONDUCTOR MAGNETIC REPRODUCER

Filed June 17, 1954

Simon Levin
INVENTOR

United States Patent Office
2,959,771
Patented Nov. 8, 1960

2,959,771

SEMICONDUCTOR MAGNETIC REPRODUCER

Simon Levin, 123 W. 44th St., New York 36, N.Y.

Filed June 17, 1954, Ser. No. 437,508
14 Claims. (Cl. 340—174.1)

The invention relates generally to the reproduction of magnetic information impressed in such media as tapes, sheets, discs or the like, and more specifically to methods of and means for translating three dimensional magnetic field patterns into electrical signals.

In certain devices utilized for the storage of information, for example such information as extended images or parallel pulses recorded in magnetic tapes, it is necessary to employ special vacuum tubes capable of scanning the tape in directions transverse to the path of the tape in order to recover the recorded information. These tubes must be constructed with a wall which permits the magnetic flux to reach into the tube to affect the electron beam and in practice are difficult to manufacture. Because the tape cannot be in contact with the beam the resolution is dependent on the thickness of this wall which must have sufficient strength to support the vacuum within the tube.

It is an object of the invention to provide methods of and apparatus for eliminating the use of special vacuum tubes with these devices.

A feature of the invention pertains to the application of magnetic fields in a manner to control carriers of charge in a semiconductor during the liberation or injection of said carriers of charge.

Another feature of the invention resides in the increased susceptibility of carriers of charge to magnetic fields when subject to said magnetic fields in a barrier or the junction of a transistor.

It is a further object of the invention to provide methods of and means for causing modulation of liberated or injected carriers of charge, said modulation being representative of magnetic signals impressed in space pattern records.

It is another object of the invention to provide methods and means for reproducing these magnetic records with high resolution.

Other features and objects of this invention will occur in connection with the following description of embodiments thereof and the appended drawings in which.

In a semiconductor there are current carriers of two types, electrons in the conduction band and positive holes in the filled valence band and there are methods well known in the art as in "transistors," for example, for increasing the concentrations in the volume of the semiconductor over the concentrations which obtain at thermal equilibrium for the purposes of the translation and control of electrical signals. In the n-type semiconductor, for example, in which the charge carriers are predominantly electrons, the carrier concentrations are increased by the introduction of holes which, through a process of space charge neutralization, produce additional electrons in the same numbers and concentrations. The bulk conductivity is thereby increased. An entirely analogous consideration applies to the introduction of electrons into a p-type semiconductor in which the carriers are predominantly holes.

The absorption of rays of radiant energy by germanium, for example, results in the production of free electron-hole pairs. If the pairs are produced in or near a collector junction, the charge is separated and collected before recombination can occur. In this area and during the period of their lifetimes, the behavior of the charge carriers may be advantageously modified by the application of magnetic fields. The collector space charge will be altered and an increment of collector current will be produced representative of the magnetic fields. Electron-hole pairs may also be produced by biasing the junction near its breakdown region. During recombination of the pairs, radiation is emitted which in turn produces further electron-hole pairs. The resulting feedback mechanism thus produces an internal emission which may be utilized for the purposes of the invention.

Figure 1:
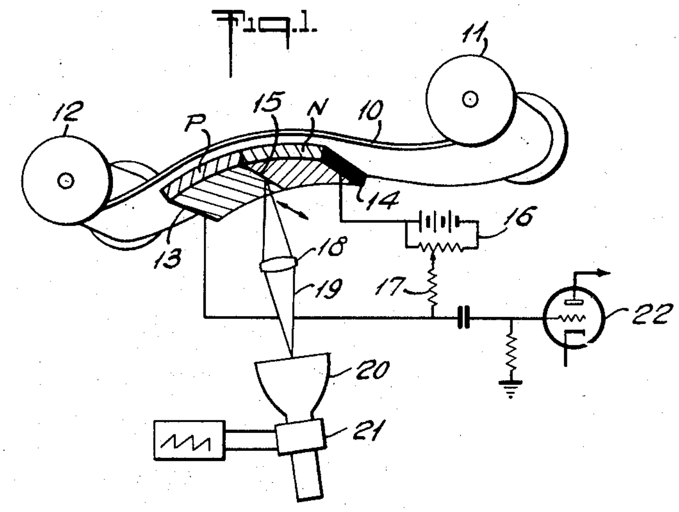
Figure 1 is a schematic diagram, partly in perspective, showing a preferred embodiment of the invention.

Referring to Figure 1 there is shown an embodiment of the invention including a collector junction 15 which comprises a barrier or high resistance condition between the semiconductors P and N which are of respectively opposite conductivity type and may be of a material such as, for example, germanium in which significant impurities have been introduced to produce the differences in conductivity. Methods of producing N and P-type regions in the construction of the devices herein described will not be discussed as it is believed that the semiconductor art is sufficiently advanced and that satisfactory methods are well known to those skilled in the art.

Figure 2:
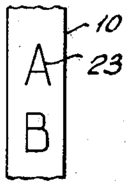
Figure 2 shows a fragment of a tape recorded with a magnetic condition space pattern.
Figure 3:
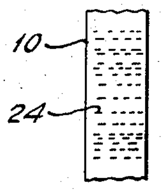
Figure 3 shows a fragment of a tape recorded with a magnetic condition time pattern.

As an example and for the purposes of the invention, an inverse bias is applied to the semiconductor by means of a power supply 16 and the ohmic contacts 13 and 14 applied respectively to the sides of the semiconductor bodies opposite the junction 15. Current changes in the semiconductors P and N cause voltage changes across a load resistor 17 which are utilized by an output stage 22. Disposed in close proximity to or in contact with the junction 15 is a tape 10 comprising a magnetic record material having flux fields impressed therein either in the form of a space pattern record 23 as shown in Figure 2 or a time pattern record 24 as shown in Figure 3.

In a mode of operation of the apparatus in Figure 1, in accordance with the invention, the P-type region is made negative with respect to the N-type region thus causing the holes and electrons to move away from each other leaving the junction 15 nearly devoid of current carriers, the junction 15 becoming a space charge region in which substantial electric fields may exist.

Referring again to Figure 1, a ray of radiant energy in the form of a beam 19 from the face of a cathode ray tube 20, for example, is focused by a lens 18 on or close to the junction 15. The beam 19 may be focused as a small spot and swept from one end of the junction 15 to the other by the sweep circuit 21 or the beam 19 may be formed by the cathode ray tube 20 into a thin bar and not swept. The tape 10 may be transported by the reels 11 and 12 or held stationary. The moving spot formed by the beam 19 is utilized with a tape 10 recorded with the space patterns 23 as shown in Figure 2. The beam 19 formed in the shape of a thin bar and fixed in position may be utilized with a tape 10 recorded with a time pattern 24 as shown in Figure 3. The time pattern 24 may also be reproduced by removing the beam 19 and increasing the bias across the junction 15 by means of the power supply 16 so that an internal emission of charge carriers results as previously described above. In the practice of the invention, carriers of charge may be produced in any well known manner. In accordance with the invention, "radiant energy" is construed to relate to radiation not only from the visible portion of the electromagnetic spectrum but also to infrared rays, ultra-violet rays, gamma rays, alpha rays, beta rays and the like.

When the beam 19 is focused directly on the junction 15, free electron-hole pairs are liberated therein. If the beam 19 is focused on a region outside of the junction 15 the electron-hole pairs diffuse in the direction thereof being attracted by the electric field. Not all of these carriers of charge arrive as recombination of the pairs takes place quickly in the bulk semiconductor. On arrival at or on liberation within the junction 15, the charge carriers are collected causing thereby an alteration of the space charge comprising the area of the collector junction 15 and thereby constituting the collector current through the load resistor 17.

At liberation and for a relatively short period thereafter the free carriers of charge may be influenced in a favorable manner by subjecting them to magnetic fields. By disposing the magnetic fields recorded on the tape 10 in such a manner so as to react with the free carriers of charge, significant deviations in the behavior of the charges may be caused resulting in a further alteration of space charge in the junction 15. Thus during collection, an incremental change of the collector current is produced which is reflected at the output circuit 22 as a signal which is representative of the flux pattern on the tape 10.

The lifetimes of the free charge carriers are relatively short as recombination and a disappearance of the charge occurs only a short distance from the liberating beam 19. If liberation takes place remote from the junction 15 little collector current is generated. Hence the beam 19 should be operated in or adjacent to the junction 15 resulting in a high spatial resolving power. Also, as a result of the positioning, in accordance with the invention, of the magnetic flux of the tape 10 in the junction 15 or immediately adjacent thereto, only a substantially thin segment of the magnetic flux reacts with the free charge carriers to produce the incremental change in collector current.

Figure 4:
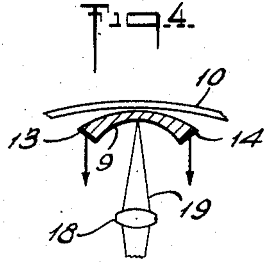
Figure 4 illustrates in section another device suitable for practicing the invention when connected to an appropriate circuit such as illustrated in use in Figure 1.

Referring to Figure 4, there is shown, in accordance with the invention and utilized in a like manner as the pick-up elements P and N described in Figure 1, a body of semiconductive material 9 which may be either of N or P conductivity type and unlike the P-N body in Figure 1 need not be constructed with a barrier layer. This body of semiconductive material 9 when impinged upon by the beam of radiant energy 19 has electron-hole pairs liberated within it and the current in the bulk material, flowing from the power supply 16 through the ohmic connections 13 and 14 is modified by the interaction of the fields recorded on the tape 10 with the liberated carriers of charge. Since there is no junction, the beam 19 may be deflected in a manner to form a raster of radiant energy whilst the tape 10 is moved intermittently or as a single line when the tape 10 is moved continuously in a like manner as described in Figure 1.

Although the foregoing junctionless device as described in Figure 4 is advantageous for the purposes of the invention, it can readily be seen that the resolution of the device will depend on the narrowness or smallness of the impinging part of the beam 19. As the beam dimensions are reduced, however, there is a consequent reduction in the liberation of the electron-hole pairs which affects the sensitivity of the device. It has been found that the presence of a barrier layer or junction provides an increase in susceptibility of the liberated pairs to the magnetic fields recorded on the tape 10, when utilized as described heretofore, so that a substantial increase in sensitivity results in a semiconductive pick-up body provided with a junction as compared to the device as shown in Figure 4. Further, a considerable control may be had over the output signal by means of the adjustment of the bias conditions (for example in a forward or reverse direction) across the junction.

Figure 5:
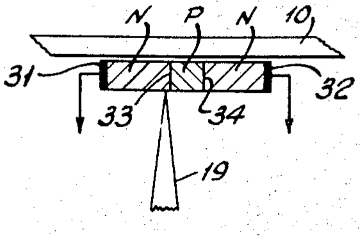
Figure 5 is a modification of the embodiment shown in Figure 1.

Referring to Figure 5 there is shown a modification of the apparatus described in Figure 1 wherein the semiconductive body is comprised of two zones or layers N and N of one conductivity type separated by a zone or layer of opposite conductivity type P, each of the zones or layers separated respectively by the barrier junctions 33 and 34. Connections are made to the N material zones by means of electrodes 31 and 32 respectively which may be terminated to a like output circuit 22 as shown in Figure 1. The radiant energy beam 19 adjusted to impinge, for example, on or near the junction 33. The normal dark current flow encounters a high impedance at the barrier junction 34. The beam 19 liberates electrons and holes. The holes diffuse into the P layer and become trapped between the junctions 33 and 34. The space charge resulting from the trapped holes lowers the barrier junction 34 allowing electrons to flow across in greater numbers. By this means the current flowing through the load resistor 17 is made substantially greater than the current produced by the impinging beam 19. The tape 10 traversing the junction 33 causes its recorded magnetic fields to interact with the free electron-hole pairs and the modulation produced is thus amplified across the barrier junction 34 in a manner as just described.

Figure 6:
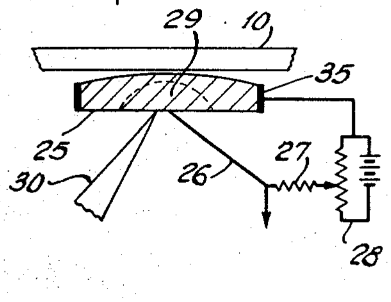
Figure 6 shows an embodiment of the invention utilizing a point contact collector.

In Figure 6 there is shown another modification of the apparatus in Figure 1 in which the semiconductor body is comprised for example of a single zone of N conductivity type material 25 made of germanium or like material and which is connected to a controllable source of bias voltage 28 through the ohmic contact 35, a load resistor 27 and a point contact 26. The output from the load resistor 27 is fed to the output circuit in a like manner as shown in Figure 1. Voltages are applied to the point contact 26 and the body 25 in a manner so as to set up the barrier 29. The body 25 is impinged upon by the beam of radiant energy 30 in close proximity to or on the place where the point contact 26 engages it. This region in the figure is shown greatly enlarged for clarity. When the tape 10 is disposed as shown in Figure 6, the magnetic fields recorded thereon interact with the carriers of charge released by the impinging beam 30 in a manner substantially as described in Figure 1.

In the foregoing, the radiant energy beam 19 has been shown as an emission from the screen of a cathode ray tube 20. In accordance with the invention, carriers of charge may be produced in the semiconductive materials shown in all of the figures by means of a beam of electrons in substantially the same manner as with the beam 19.

The semiconductive material body N-P shown in Figure 1, for example, may be sealed into an envelope of glass or other suitable material so that its surface shown in proximity to the tape 10 is external to said envelope and the opposite surface thereof is within said envelope in position to be impinged upon by said electron beam from a cathode ray gun also within said envelope said electron beam deflected by means such as coil 21.

It is to be understood that various equivalents of the embodiments disclosed may be used without departing from the spirit of the invention.

What is claimed is:

1. An apparatus for translating magnetic signals to electrical signals which comprises a semiconductor, means for energizing said semiconductor, a magnetic conditioning means, means for positioning said magnetic conditioning means whereby its fields permeate said semiconductor, means for producing carriers of charge in said semiconductor, means for subjecting said carriers of charge to successive portions of said fields; and utilization means for deriving electrical signals from said semiconductor.

2. An apparatus for translating magnetic signals to electrical signals as claimed in claim 1 wherein said means for producing said carriers of charge includes radiant energy means.

3. An apparatus for translating magnetic signals to electrical signals as claimed in claim 1 wherein said means for producing said carriers of charge includes electron discharge means.

4. An apparatus for translating magnetic signals to electrical signals which comprises a semiconductor, said semiconductor comprised of a single conductivity type material, means for energizing said semiconductor, means for producing carriers of charge in predetermined areas of said semiconductor, a magnetic conditioning means, means for subjecting said carriers of charge to successive portions of the fields of said magnetic conditioning means; and utilization means for deriving electrical signals from said semiconductor.

5. An apparatus for translating magnetic signals to electrical signals which comprises a semiconductor, said semiconductor comprised of at least one of the elements of the fourth column of the periodic table, means for energizing said semiconductor, means for producing a current of charge pairs in said semiconductor, a magnetic conditioning means, means for positioning said magnetic conditioning means whereby its fields permeate said semiconductor, means for subjecting said semiconductor to successive portions of said fields; and utilization means for deriving electrical signals from said semiconductor.

6. An apparatus for reproducing electrical signals from a pattern of magnetic fields thereof which comprises a semiconductive material body having zones of opposite conductivity separated by a junction, means for energizing said zones, a magnetic conditioning means, means for positioning said magnetic conditioning means whereby its magnetic fields permeate said junction, means for producing carriers of charge in said junction, means for subjecting said junction to successive portions of said magnetic fields; and utilization means for deriving electrical signals from said semiconductive material body.

7. An apparatus for reproducing electrical signals from a pattern of magnetic fields thereof which comprises a semiconductive material body having zones of opposite conductivity separated by a barrier, means for biasing said zones in a reverse direction, means for producing carriers of charge in said barrier, a magnetic conditioning means, means for subjecting said barrier to the fields of said magnetic conditioning means; and utilization means for deriving electrical signals from said body.

8. An apparatus for reproducing electrical signals from a pattern of magnetic fields thereof which comprises a semiconductive material body having zones of opposite conductivity separated by a barrier, means for energizing said zones in a manner so as to operate in the breakdown region of said barrier whereby carriers of charge are produced in said barrier, a magnetic conditioning means, means for subjecting said barrier to successive portions of the fields of said magnetic conditioning means; and utilization means for deriving electrical signals from said semiconductive material body.

9. An apparatus for reproducing electrical signals from a pattern of magnetic fields thereof which comprises a semiconductive material body having zones of different conductivity, means for energizing said zones, a magnetic conditioning means positioned so as to subject its fields to said zones, means for producing a current of charge pairs in excess to the charges normally present in said body, means for subjecting said current of charge pairs to successive areas of said fields; and means for deriving electrical signals from said body.

10. An apparatus for reproducing electrical signals from a pattern of magnetic fields thereof which comprises a semiconductive material body having zones of different conductivity separated by a barrier, means for biasing said zones in a forward direction, means for producing a current of charge pairs in excess to the charges normally present in said body, a magnetic conditioning means positioned in a manner whereby successive areas of its fields are subject to said barrier; and means for deriving electrical signals from said body.

11. An apparatus for reproducing electrical signals from a pattern of magnetic fields thereof which comprises a semiconductive material body, means for energizing said body, means for producing carriers of charge in said body, a magnetic conditioning means, means for subjecting said carriers of charge to successive areas of the fields of said magnetic conditioning means; and utilization means for deriving electrical signals from said body, said utilization means including a point contact collector means engaging said body.

12. An apparatus for reproducing electrical signals from a pattern of magnetic fields thereof which comprises a semiconductive material body having a first zone and a second zone of opposite conductivity separated by a first barrier, a third zone separated by a second barrier, said third zone being of opposite conductivity to the zone separated from it by said second barrier, means for producing carriers of charge in said zones, a magnetic conditioning means, means for subjecting said carriers of charge to successive areas of the fields of said magnetic conditioning means; and means for deriving electrical signals from said body.

13. An apparatus for reproducing electrical signals from a pattern of magnetic fields thereof which comprises a semiconductive material body having a plurality of zones of different conductivity each thereof separated by a junction, a magnetic conditioning means positioned in a manner whereby its fields are subjected to at least one junction between said zones, means for producing carriers of charge in said body whereby said carriers of charge are produced in greater numbers in at least one junction than are produced in the other junctions between said zones; and means for deriving the thus amplified electrical signals from said body.

14. An apparatus for reproducing electrical signals from a pattern of magnetic fields thereof which comprises a semiconductive material body having a plurality of zones of different conductivity each thereof separated by a junction, a magnetic conditioning means positioned in a manner whereby successive portions of its fields are subject to at least one of said zones, means for energizing said zones, means for producing carriers of charge in said zones; and means for deriving electrical signals from said body.

References Cited in the file of this patent

UNITED STATES PATENTS

| | | |
|---|---|---|
| 2,553,490 | Wallace | May 15, 1951 |
| 2,702,316 | Friend | Feb. 15, 1955 |